US012089585B2

(12) United States Patent
Li (10) Patent No.: US 12,089,585 B2
(45) Date of Patent: Sep. 17, 2024

(54) DOUBLE-SIDED MOSQUITO REPELLER (71) Applicant: Flextail Technology Co., Ltd, Shanghai (CN)

(72) Inventor: Tao Li, Shanghai (CN)

(73) Assignee: Flextail Technology Co., Ltd, Shanghai (CN)

( * ) Notice: Subject to any disclaimer, the term of this patent is extended or adjusted under 35 U.S.C. 154(b) by 104 days.

(21) Appl. No.: 17/838,174

(22) Filed: Jun. 11, 2022

(65) Prior Publication Data
US 2023/0011402 A1    Jan. 12, 2023

(30) Foreign Application Priority Data

Jul. 5, 2021   (CN) .......................... 202121514653.3
Mar. 25, 2022  (CN) .......................... 202220666552.6

(51) Int. Cl.
*A01M 29/14*    (2011.01)
*A01M 29/12*    (2011.01)

(52) U.S. Cl.
CPC ............ *A01M 29/14* (2013.01); *A01M 29/12* (2013.01); *A01M 2200/012* (2013.01)

(58) Field of Classification Search
CPC ...... A01M 1/22; A01M 1/023; A01M 1/2061; A01M 1/2077; A01M 29/00; A01M 29/12; Y02A 50/30
See application file for complete search history.

(56) References Cited

U.S. PATENT DOCUMENTS

| 2,513,919 | A | * | 7/1950 | Costello | H05B 1/0252 |
| | | | | | 219/541 |
| 2,611,068 | A | * | 9/1952 | Wellens | F24H 1/00 |
| | | | | | 219/541 |
| 2,931,880 | A | * | 4/1960 | Yaffe | F24H 1/00 |
| | | | | | 422/4 |
| 2,942,090 | A | * | 6/1960 | Diehl | F24H 1/00 |
| | | | | | 392/390 |

(Continued)

FOREIGN PATENT DOCUMENTS

| CN | 1283527 | A | * | 2/2001 | .......... A01M 1/2033 |
| CN | 213127783 | U | | 5/2021 | |

OTHER PUBLICATIONS

Merged translation of CN_1283527 (Year: 2001).*

*Primary Examiner* — Morgan T Jordan
(74) *Attorney, Agent, or Firm* — Bayramoglu Law Offices LLC (57) ABSTRACT

A double-sided mosquito repeller includes a main shell. A first placement bin, a second placement bin, and an installation cavity are arranged on the main shell. The first placement bin and the second placement bin are respectively arranged on two opposite side walls of the main shell. The first placement bin and the second placement bin are each configured to receive a mosquito-repellent pad. The installation cavity is provided with a heating unit, a first heat conduction unit, and a second heat conduction unit. The heating unit is sandwiched between the first heat conduction unit and the second heat conduction unit and configured to heat the heat conduction units. The first heat conduction unit is configured to heat the mosquito-repellent pad in the first placement bin, and the second heat conduction unit is configured to heat the mosquito-repellent pad in the second placement bin.

13 Claims, 5 Drawing Sheets

(56) References Cited

U.S. PATENT DOCUMENTS

| | | | | |
|---|---|---|---|---|
| 3,778,924 A * | 12/1973 | Okui | A01M 1/2088 | 392/390 |
| 4,391,781 A * | 7/1983 | van Lit | A61L 9/03 | 261/DIG. 89 |
| 4,425,302 A * | 1/1984 | Pons Pons | A01M 1/2077 | 219/385 |
| 4,467,177 A * | 8/1984 | Zobele | A61L 9/03 | 219/521 |
| 5,038,394 A * | 8/1991 | Hasegawa | A01M 1/2077 | 392/395 |
| 5,095,647 A * | 3/1992 | Zobele | A61L 9/037 | 239/59 |
| 5,201,025 A * | 4/1993 | Landesberg | A01M 1/2077 | 261/DIG. 89 |
| 5,896,697 A * | 4/1999 | Kang | A01M 1/04 | 43/107 |
| 6,031,967 A * | 2/2000 | Flashinski | A61L 9/03 | 392/390 |
| 6,151,827 A * | 11/2000 | Smith | A01M 1/2077 | 43/129 |
| 6,478,440 B1 * | 11/2002 | Jaworski | F21V 23/0442 | 362/802 |
| 6,553,711 B1 * | 4/2003 | Feng | A01M 29/16 | 43/132.1 |
| 6,569,387 B1 * | 5/2003 | Furner | A61L 9/037 | 239/289 |
| 6,790,408 B2 * | 9/2004 | Whitby | A61L 9/035 | 261/78.2 |
| 7,389,943 B2 * | 6/2008 | Jaworski | B05B 17/0646 | 239/326 |
| 7,469,844 B2 * | 12/2008 | Conway | A61L 9/127 | 239/326 |
| 7,519,279 B2 * | 4/2009 | Zobele | H01R 35/04 | 392/390 |
| 8,244,115 B2 * | 8/2012 | Wang | A01M 29/12 | 392/303 |
| 8,851,396 B2 * | 10/2014 | Irvin | A61L 9/125 | 239/326 |
| 8,891,947 B2 * | 11/2014 | Neumann | A61L 9/035 | 392/386 |
| 9,151,440 B1 * | 10/2015 | Martin | A01M 29/12 | |
| 9,669,125 B2 * | 6/2017 | Gasper | A61L 9/035 | |
| 10,182,565 B2 * | 1/2019 | Zhang | A01M 1/2022 | |
| 10,709,805 B2 * | 7/2020 | Alexander | A61L 9/013 | |
| 2007/0257016 A1 * | 11/2007 | Jin | A01M 1/2077 | 424/405 |
| 2008/0112857 A1 * | 5/2008 | McKenzie-Jones | A61L 9/03 | 362/101 |
| 2008/0298046 A1 * | 12/2008 | Samuel | A61L 9/03 | 362/96 |
| 2009/0162253 A1 * | 6/2009 | Porchia | A61L 9/02 | 422/124 |
| 2009/0294553 A1 * | 12/2009 | Wang | A01M 29/12 | 239/135 |
| 2011/0139894 A1 * | 6/2011 | Masterson | A01M 1/2088 | 239/135 |
| 2015/0181859 A1 * | 7/2015 | Shapiro | A01M 29/14 | 239/135 |
| 2019/0160194 A1 * | 5/2019 | Krause | A01M 1/2077 | |
| 2019/0373881 A1 * | 12/2019 | Herskovitz | A44C 5/0007 | |

* cited by examiner

DOUBLE-SIDED MOSQUITO REPELLER

CROSS REFERENCE TO THE RELATED APPLICATIONS

This application is based upon and claims priority to Chinese Patent Application No: 202220666552.6, filed on Mar. 25, 2022, the entire contents of which are incorporated herein by reference.

TECHNICAL FIELD

The present disclosure relates to the technical field of mosquito repelling devices, and in particular, to a double-sided mosquito repeller.

BACKGROUND

At present, the general electric heating mosquito repeller adopts single-sided heating, which has low heating efficiency, and the mosquito repelling effect cannot meet the mosquito repelling needs in an environment with lots of mosquitos.

The patent CN213127783U discloses an electric heating mosquito repeller, which includes a medicine bottle and a mosquito repeller shell. A liquid level sensor is arranged inside the medicine bottle. A threaded port is formed at a top end of the medicine bottle. A threaded sleeve is arranged at a bottom of the mosquito repeller shell. A spray port is formed at a center of a top end of the mosquito repeller shell. A control switch is arranged at the top end of the mosquito repeller shell. An outer circumferential wall of the mosquito repeller shell is provided with a power indicator, a display screen, and a power supply interface. The mosquito repeller shell and the medicine bottle are connected by the threaded sleeve and the threaded port. A water pump, a fan, a heating device, a battery, a control main board, and a bluetooth module are arranged inside the mosquito repeller shell. The control main board is electrically connected with the bluetooth module. The bluetooth module is wirelessly connected with the mobile APP client. A bottom of the water pump is connected with a conduit extending to a bottom end of an interior of the medicine bottle. A filter is arranged in a section of the conduit away from the mosquito repeller shell. However, this mosquito repeller disclosed in the patent document still has the defect of low heating efficiency and cannot meet the mosquito repelling needs in the multi-mosquito environment.

SUMMARY

In view of the defects in the prior art, an objective of the present disclosure is to provide a double-sided mosquito repeller.

A double-sided mosquito repeller provided by the present disclosure includes a main shell. A first placement bin, a second placement bin, and an installation cavity are arranged on the main shell.

The first placement bin and the second placement bin are respectively arranged on two opposite side walls of the main shell. The first placement bin and the second placement bin are each configured to place a mosquito-repellent pad.

The installation cavity is provided with a heating unit, a first heat conduction unit, and a second heat conduction unit.

The heating unit is sandwiched between the first heat conduction unit and the second heat conduction unit, and the heating unit is configured to heat the first heat conduction unit and the second heat conduction unit.

The first heat conduction unit is configured to heat the mosquito-repellent pad in the first placement bin, and the second heat conduction unit is configured to heat the mosquito-repellent pad in the second placement bin.

Preferably, the first heat conduction unit and the second heat conduction unit may both be provided with an accommodating groove.

Open ends of the two accommodating grooves may be connected. The two accommodating grooves may form an accommodating cavity. The heating unit may be arranged in the accommodating cavity.

Preferably, the heating unit may be a spherical heating piece, and the two accommodating grooves may be arranged in a hemispherical shape adapted to the shape of the heating unit.

Preferably, the main shell may include a first shell and a second shell. The first shell may be connected with and arranged on the second shell.

The first placement bin may be arranged on the first shell, and the second placement bin may be arranged on the second shell. The installation cavity may be formed between the first shell and the second shell.

Preferably, a first diffusion plate may be arranged on the first shell at a position of the first placement bin, and a second diffusion plate may be arranged on the second shell at a position of the second placement bin.

The first diffusion plate and the second diffusion plate may be configured for diffusion of odor of the mosquito-repellent pad.

Preferably, the first diffusion plate and the second diffusion plate may both be provided with insertion posts, and the first shell and the second shell may both be provided with sockets.

The first diffusion plate may be connected with and arranged on the first shell through the insertion post and the socket, and the second diffusion plate may be connected with and arranged on the second shell through the insertion post and the socket.

Preferably, the first diffusion plate and the second diffusion plate may each be a grid plate.

Preferably, the first shell and the second shell may both be in an arc shape.

Preferably, a connecting component may be arranged on the main shell, and the connecting component may be configured for connection of an external lanyard.

Preferably, a blower component may be further arranged in the installation cavity, and the blower component may be communicated with the first placement bin and the second placement bin.

Compared with the prior art, the present disclosure has the following beneficial effects:

1. The mosquito repeller transmits temperature to the first heat conduction unit and the second heat conduction unit through the heating unit, such that the mosquito-repellent pad can be heated on both sides.
2. The mosquito repeller can heat the mosquito-repellent pad on both sides to repel mosquitoes more efficiently, and is especially suitable for users to use in an outdoor multi-mosquito environment.

BRIEF DESCRIPTION OF THE DRAWINGS

Other features, objectives, and advantages of the present disclosure will become more apparent by reading the detailed description of non-limiting embodiments with reference to the following accompanying drawings.

| Reference numerals: | |
|---|---|
| Main shell 1 | First shell 9 |
| First placement bin 2 | Second shell 10 |
| Second placement bin 3 | First diffusion plate 11 |
| Installation cavity 4 | Second diffusion plate 12 |
| Heating unit 5 | Insertion post 13 |
| First heat conduction unit 6 | Socket 14 |
| Second heat conduction unit 7 | Blower component 15 |
| Accommodating groove 8 | |

DETAILED DESCRIPTION OF THE EMBODIMENTS

The following describes the present disclosure in detail in conjunction with particular embodiments. The following embodiments will be conducive to further understanding of the present disclosure by those of ordinary skill in the art, but does not limit the present disclosure in any form. It should be noted that several variations and improvements can also be made by those of ordinary skill in the art without departing from the conception of the present disclosure. These variations and improvements shall fall within the protection scope of the present disclosure.

Embodiment 1

As shown in FIG. 1 to FIG. 6, the present embodiment provides a double-sided mosquito repeller, including a main shell 1. A first placement bin 2, a second placement bin 3, and an installation cavity 4 are arranged on the main shell 1. The first placement bin 2 and the second placement bin 3 are respectively arranged on two opposite side walls of the main shell 1. The first placement bin 2 and the second placement bin 3 are each configured to place a mosquito-repellent pad. The installation cavity 4 is provided with a main control unit 5, a rechargeable battery, a heating unit 5, a first heat conduction unit 6, and a second heat conduction unit 7. The rechargeable battery, the main control unit, and the heating unit 5 are electrically connected in sequence. The heating unit 5 is sandwiched between the first heat conduction unit 6 and the second heat conduction unit 7. The heating unit 5 is configured to heat the first heat conduction unit 6 and the second heat conduction unit 7. The first heat conduction unit 6 is configured to heat the mosquito-repellent pad in the first placement bin 2. The second heat conduction unit 7 is configured to heat the mosquito-repellent pad in the second placement bin 3. The heating unit 5 is a metal ceramic heater (MCH). In other embodiments, it may also be a positive temperature coefficient (PTC) heating sheet heating sheet. The first heat conduction unit 6 is an aluminum metal heat conduction sheet or a copper metal heat conduction sheet. The second heat conduction unit 7 is an aluminum metal heat conduction sheet or a copper metal heat conduction sheet.

The main shell 1 includes a first shell 9 and a second shell 10. The first shell 9 is connected with and arranged on the second shell 10. The first placement bin 2 is arranged on the first shell 9, and the second placement bin 3 is arranged on the second shell 10. The installation cavity 4 is formed between the first shell 9 and the second shell 10. The first shell 9 and the second shell 10 are both in an arc shape. The shape is basically arc rectangle, such that the mosquito repeller is easy to hold by hand, and the volume is relatively small, convenient to carry outdoors, and can be stored in handbags, backpacks, and coat pockets.

Figure 6:
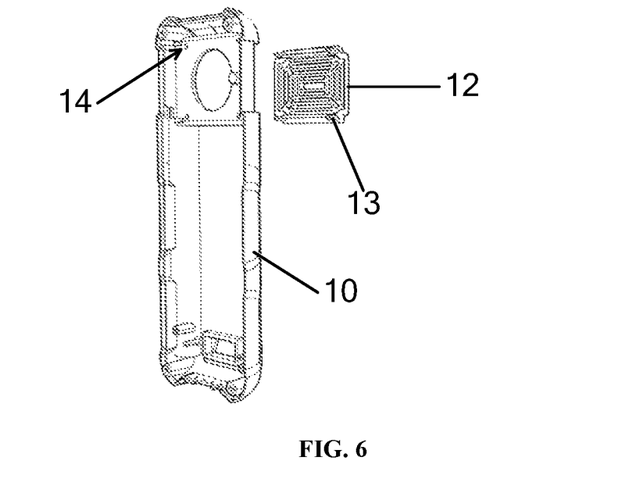
FIG. 6 is a structural diagram of a double-sided mosquito repeller in an embodiment with an insertion post and a socket highlighted.

A first diffusion plate 11 is arranged on the first shell 9 at a position of the first placement bin 2. A second diffusion plate 12 is arranged on the second shell 10 at a position of the second placement bin 3. The first diffusion plate 11 and the second diffusion plate 12 are configured for diffusing the odor of the mosquito-repellent pad. The first diffusion plate 11 and the second diffusion plate 12 are each provided with an insertion post 13, and the first shell 9 and the second shell 10 are each provided with a socket 14. The first diffusion plate 11 is connected with and arranged on the first shell 9 through the insertion post 13 and the socket 14, and the second diffusion plate 12 is connected with and arranged on the second shell 10 through the insertion post 13 and the socket 14. The diffusion plates are detachably arranged on the shell through the insertion post 13 and the socket 14. When the diffusion plates are damaged, it is convenient to replace the diffusion plates, which improves the practicability of the double-sided mosquito repeller. The first diffusion plate 11 and the second diffusion plate 12 are each a grid plate. The grid plate is conducive to diffusing the odor of the mosquito-repellent pad and enhances the mosquito repelling effect.

Figure 5:
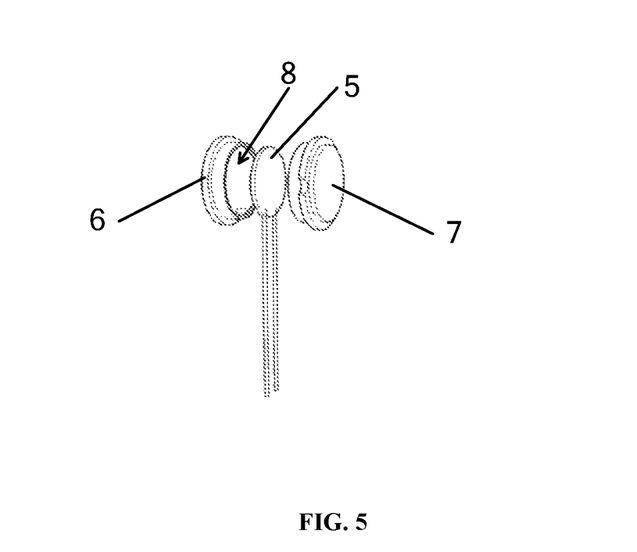
FIG. 5 is a structural diagram of a double-sided mosquito repeller in an embodiment with an accommodating groove highlighted.

The first heat conduction unit 6 and the second heat conduction unit 7 are each provided with an accommodating groove 8. Open ends of the two accommodating grooves 8 are connected. The two accommodating grooves 8 form an accommodating cavity. The heating unit 5 is arranged in the accommodating cavity. The heating unit 5 in the present embodiment is an MCH ceramic heating unit, which is a cylindrical heating sheet. The heating sheet is completely located in the accommodating cavity and in complete contact with an inner side wall of the accommodating cavity, which improves the heat conduction effect, the heating effect on the mosquito-repellent pad, and enhances the mosquito repelling effect.

Figure 1:
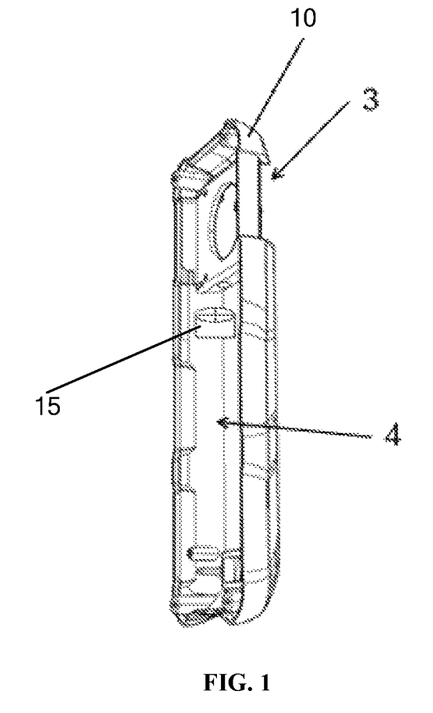
FIG. 1 is a partial schematic diagram of a double-sided mosquito repeller in an embodiment.
Figure 2:
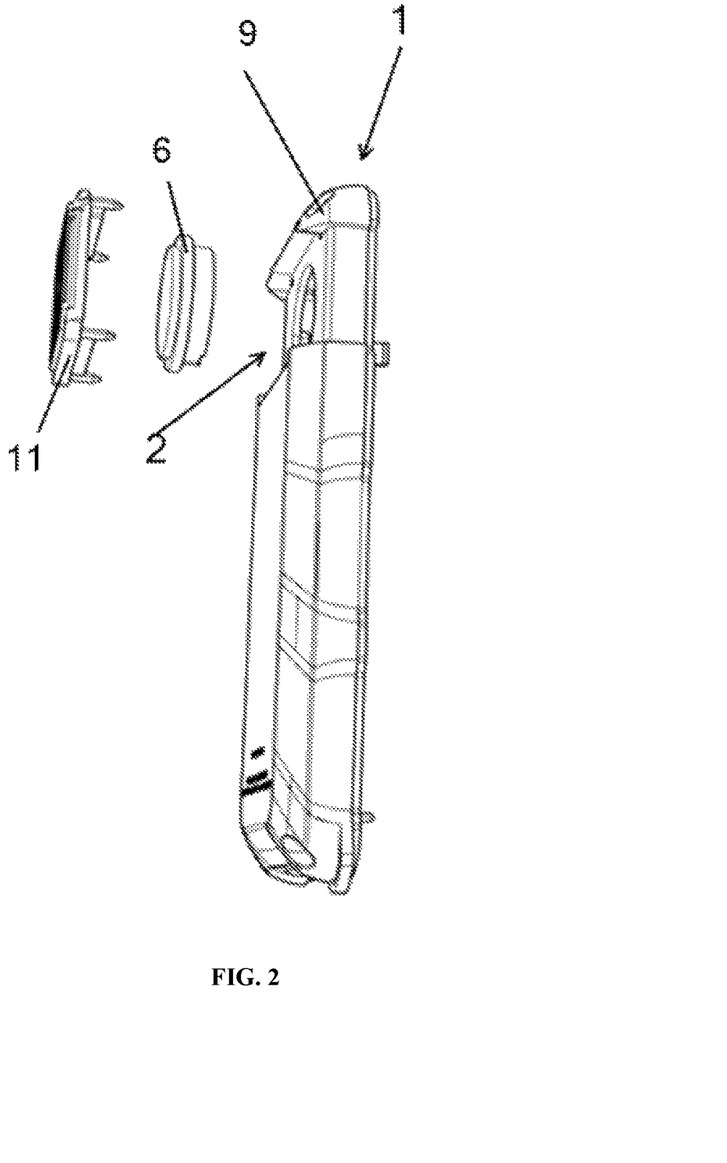
FIG. 2 is a partial explosion diagram I of a double-sided mosquito repeller in an embodiment.
Figure 3:
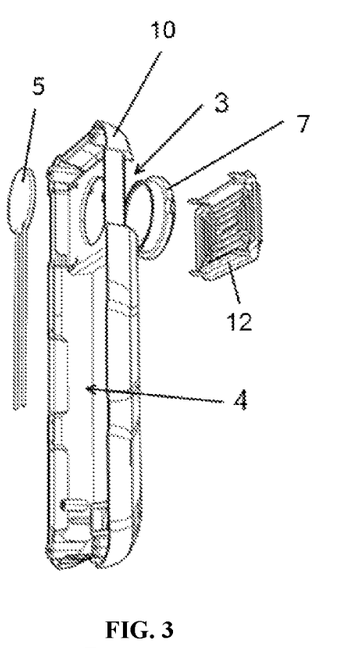
FIG. 3 is a partial explosion diagram II of a double-sided mosquito repeller in an embodiment.
Figure 4:
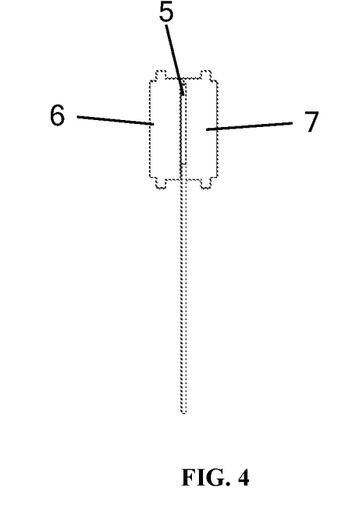
FIG. 4 is a partial cross-sectional view of a double-sided mosquito repeller in an embodiment.

In other embodiments, as shown in FIG. 1, a blower component 15 is further arranged in the installation cavity 4. The blower component 15 is in communication with the first placement bin 2 and the second placement bin 3. The blower component 15 blows air into the placement bins, which is conducive to the diffusion of the odor of the mosquito-repellent pad and improving the mosquito repelling effect. In a common design, the blower component is a small fan, through holes are provided on side walls at bottoms of the first placement bin 2 and the second placement bin 3, and the small fan blows air toward the through holes.

A connecting component is arranged on the main shell 1, and the connecting component is configured for connection of an external lanyard. The connecting component may be a hanging hole, such that the lanyard can be installed, so it is more convenient for outdoor use. For example, the lanyard can be hung on a backpack, a branch, a tent roof, etc.

Working principle: The heating unit 5 transmits heat to the first heat conduction unit 6 and the second heat conduction unit 7, so as to achieve double-sided efficient mosquito repelling.

Embodiment 2

Figure 7:
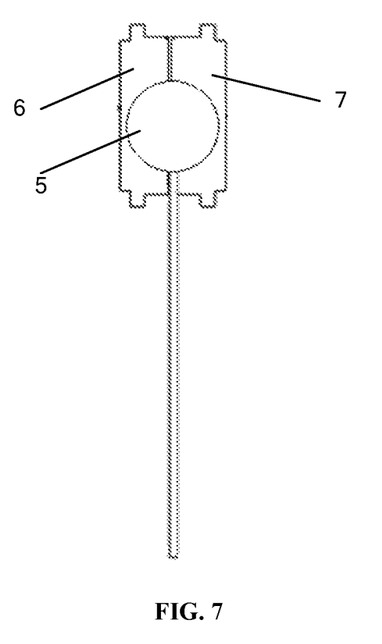
FIG. 7 is a schematic diagram of a double-sided mosquito repeller in an embodiment with a positional relationship between a heating unit and a heat conduction sheet highlighted.

As shown in FIG. 7, the difference from Embodiment 1 is that the heating unit 5 is a spherical heating piece, and the two accommodating grooves 8 are arranged in a hemispherical shape adapted to the shape of the heating unit 5.

The heating unit 5 is arranged as a spherical heating piece, which further increases contact areas of the heating unit 5 with the first heat conduction unit 6 and the second heat conduction unit 7, improves the heat conduction effect, enhances the heating effect of the first heat conduction unit 6 and the second heat conduction unit 7 on the mosquito-repellent pad, and strength the mosquito repelling effect of the double-sided mosquito repeller.

The present disclosure adopts the heating unit to transmit a temperature (e.g., heat) to the first heat conduction unit and the second heat conduction unit, so as to achieve the double-sided mosquito repelling effect, thereby enhancing the mosquito repelling effect.

In the description of the present disclosure, it needs to be understood the orientation or positional relationships indicated by the terms "up", "down", "front", "rear", "left", "right", "vertical", "horizontal", "top", "bottom", "inside", "outside", etc. are based on the orientation or positional relationships shown in the accompanying drawings. The orientation or positional relationships are merely for facilitating the description of the present disclosure and simplifying the description, rather than indicating or implying that an apparatus or element referred to must have a particular orientation or be constructed and operated in a particular orientation, and therefore should not be interpreted as limiting the present disclosure.

The particular embodiments of the present disclosure are described as above. It should be understood that the present disclosure is not limited to the above specific embodiments. Those skilled in the art can make various changes or modifications within the scope of the claims, which does not affect the essence of the present disclosure. The embodiments in the present disclosure and features in the embodiments may be arbitrarily combined with each other in a non-conflicting situation.

What is claimed is:

1. A double-sided mosquito repeller, the double-sided mosquito repeller comprising:
   a first placement bin;
   a second placement bin;
   an installation cavity;
   only a single heating unit; and
   a main shell, wherein the first placement bin, the second placement bin, and the installation cavity are arranged on the main shell, and
   wherein:
      the first placement bin and the second placement bin are respectively arranged on two opposite side walls of the main shell; and the first placement bin and the second placement bin are each configured to receive a mosquito-repellent pad;
      the installation cavity is provided with the single heating unit, a first heat conduction unit, and a second heat conduction unit;
      the single heating unit is sandwiched between the first heat conduction unit and the second heat conduction unit, and the single heating unit is configured to heat the first heat conduction unit and the second heat conduction unit to substantially a same temperature at substantially a same time; and
      the first heat conduction unit is configured to heat the mosquito-repellent pad in the first placement bin, and the second heat conduction unit is configured to heat the mosquito-repellent pad in the second placement bin.

2. The double-sided mosquito repeller according to claim 1, wherein the first heat conduction unit is provided with a first accommodating groove, and the second heat conduction unit is provided with a second accommodating groove; and
   an open end of the first accommodating groove and an open end of the second accommodating groove are connected, the first accommodating groove and the second accommodating groove form an accommodating cavity, and the single heating unit is arranged in the accommodating cavity.

3. The double-sided mosquito repeller according to claim 2, wherein the single heating unit is a spherical heating piece, and the first accommodating groove and the second accommodating groove are arranged in a hemispherical shape adapted to a shape of the single heating unit.

4. The double-sided mosquito repeller according to claim 1, wherein the main shell comprises a first shell and a second shell; and the first shell is connected with and arranged on the second shell; and
   the first placement bin is arranged on the first shell, and the second placement bin is arranged on the second shell; and the installation cavity is formed between the first shell and the second shell.

5. The double-sided mosquito repeller according to claim 4, wherein a first diffusion plate is arranged on the first shell at a position of the first placement bin, and a second diffusion plate is arranged on the second shell at a position of the second placement bin; and
   the first diffusion plate and the second diffusion plate are configured for diffusing an odor of the mosquito-repellent pad.

6. The double-sided mosquito repeller according to claim 5, wherein the first diffusion plate is provided with a first insertion post, the second diffusion plate is provided with a second insertion post, the first shell is provided with a first socket, and the second shell is provided with a second socket; and
   the first diffusion plate is connected with and arranged on the first shell through the first insertion post and the first socket, and the second diffusion plate is connected with and arranged on the second shell through the second insertion post and the second socket.

7. The double-sided mosquito repeller according to claim 5, wherein the first diffusion plate and the second diffusion plate are each a grid plate.

8. The double-sided mosquito repeller according to claim 4, wherein the first shell and the second shell are both in an arc shape.

9. The double-sided mosquito repeller according to claim 1, wherein a blower component is further arranged in the installation cavity, and the blower component is in communication with the first placement bin and the second placement bin.

10. The double-sided mosquito repeller according to claim 9, the first placement bin and the second placement bin having through holes in bottom sidewalls of the placement bins, air from the blower component being directed towards the through holes.

11. The double-sided mosquito repeller according to claim 1, further comprising a battery, wherein the single heating unit is powered by the battery.

12. The double-sided mosquito repeller according to claim 1, wherein the main shell further comprises a connecting component is configured for connection of an external lanyard.

13. The double-sided mosquito repeller according to claim 1, wherein the first heat conduction unit and the second heat conduction unit are substantially a same distance from the single heating unit.

\* \* \* \* \*